United States Patent
Breuninger et al.

(10) Patent No.: US 8,374,752 B2
(45) Date of Patent: Feb. 12, 2013

(54) METHOD AND DEVICE FOR ACTIVATING PERSONAL PROTECTION MEANS

(75) Inventors: Joerg Breuninger, Hemmingen (DE); Josef Kolatschek, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 842 days.

(21) Appl. No.: 12/308,182

(22) PCT Filed: Jul. 10, 2007

(86) PCT No.: PCT/EP2007/057008
§ 371 (c)(1),
(2), (4) Date: Jul. 16, 2009

(87) PCT Pub. No.: WO2008/019915
PCT Pub. Date: Feb. 21, 2008

(65) Prior Publication Data
US 2009/0306858 A1 Dec. 10, 2009

(30) Foreign Application Priority Data

Aug. 16, 2006 (DE) .......................... 10 2006 038 151

(51) Int. Cl.
*B60R 22/00* (2006.01)

(52) U.S. Cl. .............. 701/45; 701/46; 701/47; 701/408; 701/300; 180/271; 180/282; 280/734; 280/735; 280/739; 340/436; 340/903

(58) Field of Classification Search .................. 701/45, 701/408, 46, 47; 707/0.117, 45, 999.1; 280/735, 280/739, 734
See application file for complete search history.

(56) References Cited

U.S. PATENT DOCUMENTS

| | | | | |
|---|---|---|---|---|
| 5,487,172 A * | 1/1996 | Hyatt | ............................... | 712/32 |
| 6,326,971 B1 * | 12/2001 | Van Wieringen | ............. | 345/474 |
| 7,147,246 B2 * | 12/2006 | Breed et al. | ................... | 280/735 |
| 2003/0154017 A1 * | 8/2003 | Ellis | .............................. | 701/117 |
| 2005/0015396 A1 * | 1/2005 | Vu | ................................ | 707/100 |
| 2006/0167784 A1 * | 7/2006 | Hoffberg | ......................... | 705/37 |
| 2006/0208169 A1 * | 9/2006 | Breed et al. | ................... | 250/221 |
| 2007/0272468 A1 * | 11/2007 | Koehler et al. | ............... | 180/282 |
| 2009/0306858 A1 * | 12/2009 | Breuninger et al. | ........... | 701/45 |

FOREIGN PATENT DOCUMENTS

| | | |
|---|---|---|
| DE | 103 60 893 | 7/2005 |
| DE | 10 2004 018288 | 11/2005 |
| DE | 10 2006 002 747 | 7/2007 |
| EP | 0 305 654 | 3/1989 |
| WO | WO 2005/061281 | 7/2005 |

OTHER PUBLICATIONS

Bernhard Schölkopf and Alex Smole: Learning with Kernels, MIT Press, Cambridge, MA, 2002.

\* cited by examiner

*Primary Examiner* — Redhwan K Mawari
(74) *Attorney, Agent, or Firm* — Kenyon & Kenyon LLP

(57) ABSTRACT

A device and a method for activating a personal protection device are provided, in which a feature vector with at least two features is formed by an evaluation circuit from at least one signal of an accident sensor system. The evaluation circuit classifies the feature vector in the corresponding dimension using at least one class boundary. The activation circuit generates an activation signal which activates the personal protection device.

11 Claims, 3 Drawing Sheets

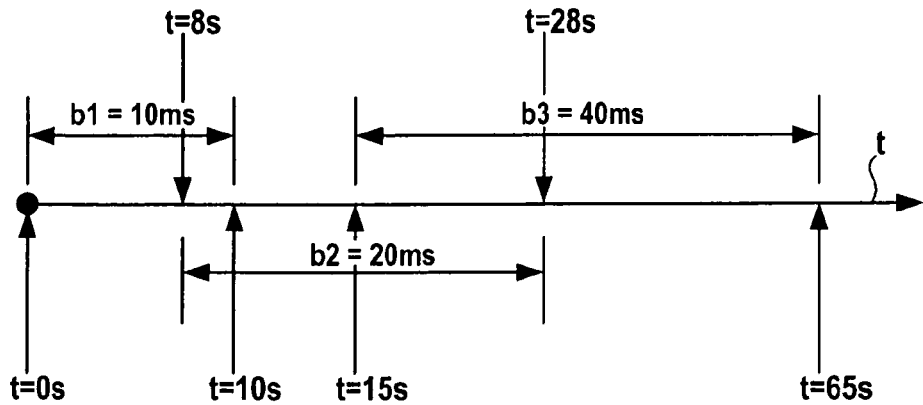
Fig. 6
Fig. 7
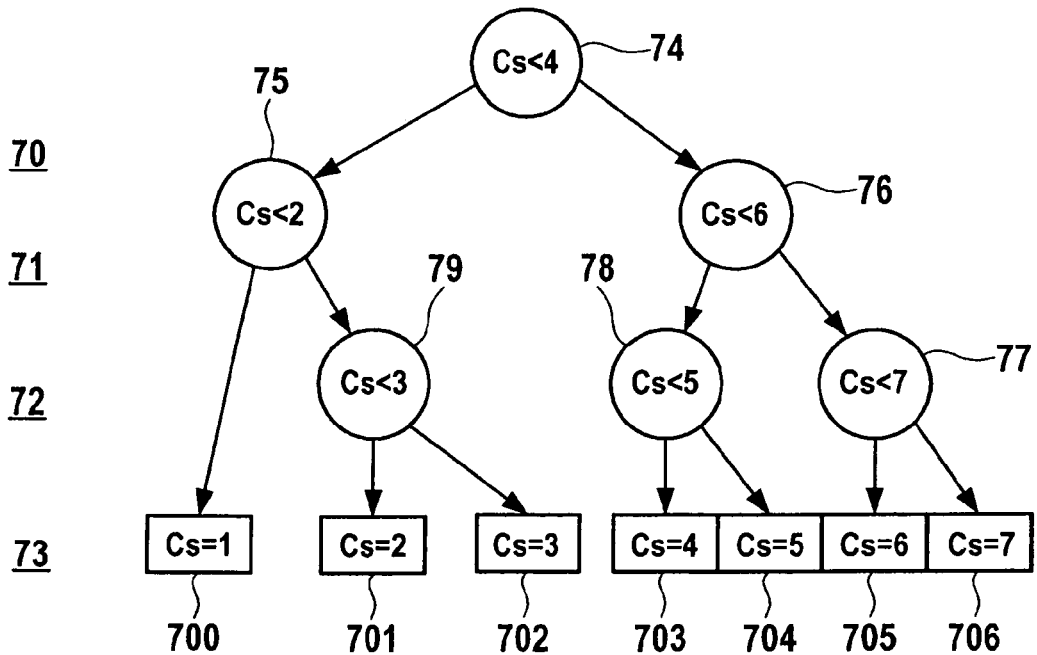

METHOD AND DEVICE FOR ACTIVATING PERSONAL PROTECTION MEANS

BACKGROUND OF THE INVENTION

1. Field of the Invention

The present invention relates to a method and a device for activating personal protection means, e.g., in a vehicle.

2. Description of Related Art

It is known from published German Patent No. 103 60 893 for personal protection means to be activated as a function of a comparison of a forward displacement with a threshold value. The threshold value is set as a function of a speed reduction and a deceleration. The speed reduction and the deceleration span a two-dimensional feature space which is divided by the threshold value into two regions. Those two regions characterize the classes that are significant for activation of the personal protection means, the threshold value representing the class boundary.

BRIEF SUMMARY OF THE INVENTION

The method according to the present invention for activating personal protection means and the device according to the present invention for activating personal protection means have the advantage over the related art that the application of the class boundaries is not restricted to a two-dimensional or three-dimensional feature space. In particular, it is possible for dependencies of the features in spaces larger than the third dimension to be used. Class membership is determined by a linear combination of a nonlinear function with feature values. The method is thus capable of being calculated and reproduced well on a control device. With the device according to the present invention and the method according to the present invention it is possible for complex classification problems to be solved very well.

The method according to the present invention preferably uses a so-called support vector machine (SVM). The latter is well-established through statistical learning theory. The determination of the class boundaries is given by an analytically solvable optimization problem, and therefore this procedure may be carried out automatically, without additional expert knowledge, by a calculating machine, especially by an evaluation circuit, which may be in the form of a microcontroller. There are in this instance only a small number of parameters that have to be set by the user, that is, by an applications engineer. It may therefore be adapted without any great effort to various classification problems connected with accident recognition. The classification quality of the method according to the present invention is very high. Owing to setting during the finding of the class boundaries, the method according to the present invention permits additional free spaces to be utilized. The method according to the present invention has a very high generalization ability. That is to say, there is no risk that the decision process will be optimized too greatly for the data set used during application (training data set) and will therefore offer poor classification performance for previously unknown data not present in the set of training data.

In accordance with an example embodiment of the present invention, the feature vector is at least two-dimensional. For classification, the feature vector is compared with the class boundary. If the feature vector lies within a corresponding class, then it is assigned to that class.

The accident sensor system may contain a number of accident sensors, including different types. The interface to the accident sensor system may be in the form of hardware or software. In particular, there may be a software interface on the evaluation circuit, especially a microcontroller. Instead of a microcontroller, it is also possible for other processors or ASICs to be used as the evaluation circuit. The activation circuit also may be in the form of an integrated circuit in a control unit for activating personal protection means. Altogether, the device may be configured as a control unit for activating personal protection means or may be integrated in a control unit for activating safety means. The latter control unit may in fact also activate a dynamic handling control system.

The class boundary or boundaries may already be determined in advance. It is possible to use for this especially a data-oriented modeling method of a support vector machine (SVM). That method is known, for example, from Bernhard Schölkopf and Alex Smole: Learning with Kernels, MIT Press, Cambridge, Mass., 2002. It will be described briefly hereinafter.

It is especially advantageous for the class boundary to be loaded from a memory. Alternatively, it is possible for the class boundary to be determined using at least one training vector and using a kernel. In the case of the support vector machine, that specific training vector is a so-called support vector which, as will be shown below, is used for certain solutions where there is constraint for the determination of the minimum of a function. For the determination of the solution it is necessary to have the features in such a form that they are separable by a simple class boundary in the form of a straight line, or in the case of higher-dimensional input data in the form of a hyperplane (i.e. are linearly separable in both cases). As will be explained in detail later, the kernel enables the features to be put into such a linearly separable form of representation implicitly without its being necessary for that step to be carried out explicitly and thus with high computational effort. That method of the support vector machine makes possible an efficient and highly reproducible method for formulating an activation algorithm. In particular, it is possible for complex classification problems to be solved therewith. Above all, the support vector machine method makes it possible for expert knowledge, which is necessary in the solutions according to the related art, to be minimized or even completely omitted. That then also makes an algorithm more transparent and easier to interpret. The resources required for representation of the class boundary (characteristic line) are reduced and the applications expenditure is reduced.

It is further advantageous for the classification to be performed in binary form. This is simple to implement and, by using a tree structure, allows a division into classes with successive refinement. In that structure, binary classifiers are provided at each of the branching points. In that manner it is then possible to realize classification problems by modular combination of such binary classifiers. By omitting binary classifiers within the tree that are not required, it is possible for the method according to the present invention and the device according to the present invention to be simplified to a reasonable level. In the extreme case, it is then reduced to a simple binary classifier.

It is advantageously possible in that case for two or more classification trees of the same or different kinds to be used in parallel. In that manner, one tree may determine, for example, the severity of a crash and the other tree may determine, independently thereof, the type of crash. This may then be later linked again in order to find the right activation.

In addition, it is advantageous to assign a specific restraint means to each tree. For example, it is possible to assign to a first tree the activation of a seat belt tensioner and to a second tree the activation of an airbag. If both trees use simple, single binary classifiers that know only the classes Fire and NoFire, it is nevertheless possible in that manner for differing activation of the restraint means to be achieved. The activation of the restraint means accordingly takes place on the basis of the accident situation determined by the classifier. In the case of a simple classifier Fire/NoFire, on recognition of the class Fire, for example, the activation signal causes immediate activation of an associated personal protection means.

In a more demanding form of implementation, the activation signal uses, for example, the information on the type of crash and the severity of the crash in combination. For that purpose there is stored in a special table for each combination of those two quantities a specific combination of personal protection means which is then activated.

Apart from the method given as an example above for solving one of the mentioned classification problems with more than two classes, other methods may also be applied. The Schölkopf et al. reference given above also presents other procedures by which such a multiclass problem may be solved in a favorable manner. Those procedures are known in the literature by the names "one versus the rest", pairwise classification", "error correcting output coding" and "multiclass objective functions".

For particular problems that occur in the context of accident recognition and classification it may be that only training data of a given class are available. The task is then to establish whether a feature vector for an event determined by measurement belongs precisely to that class or not. This corresponds to a so-called one-class classifier. For this also, the method according to the present invention and especially the support vector machine algorithm may be used in an advantageous manner. It is then possible for the quality or sensitivity to be set therein, typically by way of a parameter V. Such a situation exists, for example, in the classification of misuse events. Since misuse events, that is, non-triggering cases, may be carried out considerably more easily and more cheaply than crash tests, in which the vehicle is destroyed, a large number of such test data are usually available. Using a one-class classifier, therefore, it is possible to construct a misuse recognition system. That is to say, all feature vectors that are outside that class are triggering cases.

Advantageously, a regression may be used to generate a continuous value for the classification. This is advantageous especially in the case of a class division describing a constant increase in a certain property, for example when the class describes the crash severities or crash speeds. The advantage in this is that in such a case the output of the system is composed not only of the discrete numerical values but of a real numerical value from a continuous value range. The corresponding procedures are also described in Schölkopf et al. as indicated above. The numerical value or values may then in turn be assigned by way of tables to a specific activation pattern of personal protection means.

Advantageously, the at least two features are ascertained from a time block of the at least one signal. For this, the signals of individual sensors, which are also already preprocessed, for example by filtering or integration, are considered in relation over a specific period, namely the block length. The feature vector is composed of quantities characterizing the signal within that block. This may be, for example, the mean value of the sensor data, the variance or higher moments, the first integral, the second integral, the coefficients of a wavelet decomposition, of a Fourier decomposition, the index values of a code book, if a vector quantization is applied to the input data within the block. Equally, it is possible for the coefficients of a polynomial regression to be determined. The one or more feature quantities selected may be determined in one step at the time of the block end or alternatively may be determined continuously or recursively with the arrival of the data, that is, of the signal. In the extreme case, it is also possible for the block length T to be adjusted to the scanning time of the sensor, so that each data block contains precisely one data value which is then converted accordingly into one feature vector. The feature vector may also contain suitably processed data of different sensors having optionally differing sensing principles. If different blocks are used, those blocks may also overlap or be separated from one another in time.

Advantageously, the use of one feature vector makes it possible for the features of the feature vector to be formed from signals of different sensors. In that manner, a comprehensive description of the accident event is possible.

Advantageously, there is a computer program which runs on the control unit, especially the evaluation circuit, such as, for example, a microcontroller. That computer program may be written in an object-oriented language or in other commonly used computer languages. In particular, that computer program may be in the form of a computer program product on a data medium that is machine-readable, for example a hard disk, an electronic memory such as an EEPROM, or on a magneto-optical data medium or an optical data medium such as a DVD or a CD.

BRIEF DESCRIPTION OF THE SEVERAL VIEWS OF THE DRAWING

FIG. 6 shows a block structure.

FIG. 7 shows a tree structure.

DETAILED DESCRIPTION OF THE INVENTION

Figure 1:
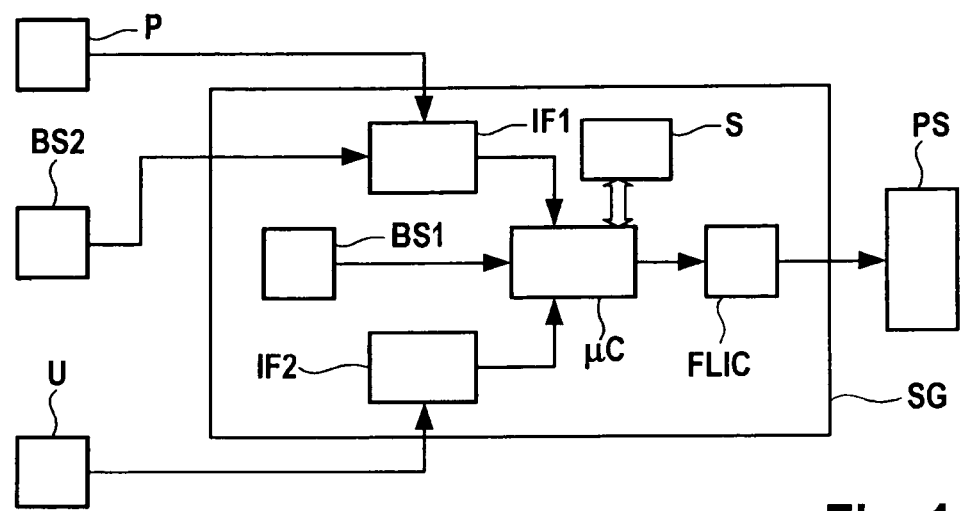
FIG. 1 is a block diagram of the device according to the present invention.

There follows an explanation of the basic concept of the support vector machine algorithm which may be used for the method according to the present invention.

The SVM algorithm is capable, in the simplest case, of performing a binary classification, that is to say, of assigning an unknown data vector to one of two classes on the basis of a training data set composed of data vectors. Since the two classes are not necessarily separable by a simple class boundary in the form of a straight line, or in the case of higher-dimensional input data a hyperplane (i.e. in both cases are not linearly separable), they would have to be mapped by a transformation into a higher-dimensional feature space where such separation is possible. In turn, in the original space, that separating hyperplane would correspond to a nonlinear separating surface.

Using a kernel, the SVM algorithm now makes it possible to calculate that separating surface without previously performing mapping into the feature space. This significantly reduces the demands made on computation performance, and in many cases (especially those with a high-dimensional feature space) makes it technically possible for the classification to be performed in the first place. Since the nonlinear separating surface in the input data space may in each case be reduced to a linear separating space in the feature space, the generalization ability of the classification method may be set well.

Since detailed descriptions of the method are to be found in the literature (e.g. in Bernhard Schölkopf and Alex Smola; Learning with Kernels; MIT Press, Cambridge, Mass., 2002), only a brief summary will be given here.

Simple Case: there are two classes which are linearly separable, that is, by a class boundary that exists in the form of a straight line (in the two-dimensional feature space) or in the form of a plane or hyperplane in the higher-dimensional feature space. Each of the i feature vectors $x_i$ of a training data set may be combined with the class information $y_i$ to give a data pair $z_i$. The two classes are assigned the values +1 and −1, where, for example, +1 may denote Fire crash and −1 NoFire crash.

Therefore:

data pairs $z_i=(x_i,y_i)$, with $1 \leq i \leq l$ where
$y_i \in \{-1,+1\}$ indicates the class information and the $x_i$ represent the respectively multidimensional feature vectors. A linear multidimensional separating plane (hyperplane) between the two classes then has the form:

$f(x)=W^\tau x+b$

This then gives:

$w^\tau x_i+b \geq 1$, if $y_i=1$  (class 1)

$w^\tau x_i+b \leq -1$, if $y_i=-1$  (class 2)

Combined:

$y_i(w^\tau x_i+b) \geq -1$.

There is now sought precisely that hyperplane for which the margin m between the classes 1 and 2 becomes the maximal margin. It is precisely that hyperplane that is the optimal hyperplane for separation of the two classes and that has the better generalization properties.

The normalized margin may be expressed as $$m = \frac{1}{|w|}$$

The maximal margin is now that for which the function $$E(w) = \frac{1}{2}|w|^2$$

becomes minimal.

The determination of the class boundary may accordingly be reduced to the following task:

$$E(w) = \frac{1}{2}|w|^2$$

is to be minimized under the constraint of the correct classification of the training data, i.e.:

$y_i(w^\tau x_i+b) \leq 1$, with $1 \leq i \leq l$.

That is a standard problem (minimization of a quadratic function with linear inequalities as a constraint) and may be solved by appropriate methods.

It may be formulated as a Lagrange function:

$$L(w,b,a) = \frac{1}{2}|w|^2 - \sum_{i=1}^{l} a_i(y_i(w^T x_i + b) - 1),$$

wherein the $a_i$ are the Lagrange multipliers.

According to the Karush-Kuhn-Tucker (KKT) theorem, the following additional conditions arise for the inequality constraints:

For the optimal values of w, b and $a_i$, designated w*, b* and a*:

$a*(y_i(w^\tau x_i+b*)-1)=0$ with $1 \leq i \leq l$, i.e. the constraint is either met or the associated Lagrange multiplier is zero (KTT complementarity condition). This is an extremely advantageous property, for it clearly states that only a fraction of the feature vectors make any significant contribution to the determination of the class boundaries and have to be taken into consideration, namely precisely those for which the Lagrange multipliers are not equal to zero. Those vectors are called support vectors. In these, therefore, the information on the optimal hyperplane is present in compressed form.

By re-formulating, the finding of the solution for the optimal hyperplane may be formulated as a "dual optimization problem" which is dependent merely on the scalar products of the feature vectors $x_i$:

$$L(a) = -\frac{1}{2}\sum_{i,j=1}^{l} a_i a_j y_i y_j x_i^T x_j + \sum_{i=1}^{l} a_i = -\frac{1}{2}a^T K a + 1^T a$$

This may be solved using standard methods of quadratic programming.

For practical application, the above approach has to be further expanded. In the case of training feature vectors generated from real crash data sets it is always possible for points to be present therein that are not separable or that fall within the region of the margin (e.g. owing to measuring errors). In order that a solution is nevertheless obtained, a slack variable ξ has to be introduced into the constraint, which introduces a tolerance towards such deficient training data. The relevant equation is then:

$y_i(w^T x^i+b) \leq 1-\xi_i \leq 0$.

The function to be minimized may then be expressed as $$E(w) = \frac{1}{2}|w|^2 + C\sum_{i=1}^{l} \xi_i,$$

wherein C may be understood as a noise parameter that limits the effect of a training data value on the class boundary.

The Lagrange function of the dual optimization problem is then obtained accordingly as given above.

Typical Case:

The case of linear separability occurs in classification problems for activation of restraint means rather infrequently. Far more often, the feature vectors form an arrangement that may be separated into the relevant classes only by a nonlinear class boundary. It would be possible to circumvent that problem by performing mapping $\phi(x):R^n \rightarrow E$ into the one higher-dimensional feature space E in which the classes are again linearly separable. Correspondingly, the Lagrange function to be solved would be written:

$$L(a) = -\frac{1}{2}\sum_{i,j=1}^{l} a_i, a_j, y_i, y_j(\Phi(x_i), \Phi(x_j)) + \sum_{i=1}^{l} a_i.$$

The previous scalar product $(x_i, x_j)$ is replaced in the feature space by the scalar product $(\phi(x_i),\phi(x_j))$.

This is where a decisive advantage of an SVM comes into effect. In the SVM, the mapping $\phi(x):R^n \rightarrow E$ is not performed at all. Instead, a particular property of scalar products is used, which is given by Mercer's theorem. According to that theorem, under certain conditions the scalar product $(\phi(x_i),\phi(x_j))$ may be replaced by a so-called kernel $k(x_i,x_j)$ which gives the same result. Thus, projection into the higher-dimensional space may be ignored and, instead, the solution may be directly calculated in the lower-dimensional input space. This procedure is called the "kernel trick".

Suitable kernels are, for example:

$$\text{the } Gau\beta \text{ kernel: } k(x_i, x_j) = \exp\left(-\frac{\|x_i - x_j\|^2}{c}\right)$$

the polynomial kernel: $k(x_i,x_j)=((x_i^T x_j)+\theta^d$
the sigmoid kernel: $k(x_i,x_j)=\tan h(K(x_i^T x_j)+\theta)$ $$\text{the inverse multiquadratic kernel: } k(x_i, x_j) = \frac{1}{\sqrt{\|x_i - x_j\|^2 + c^2}}$$

In addition, a large number of other possible kernels are mentioned in the mentioned literature, all of which may be suitable where appropriate. As with the simple linear case, in the case of non-separable classes also it is advantageous to introduce the slack variable ξ into the constraint. The equations given therein remain mutatis mutandis the same. In this case also, the solution may then be found in a simple manner by applying a standard method to solve a quadratic optimization problem under linear constraints. Suitable methods in this case are, for example, LOQO or equivalent methods.

All in all it may be said that the SVM, unlike many other methods, does not make an estimation of a density function underlying the input data, but minimizes the so-called worst-case risk of the classification. It therefore belongs to the class of "distribution-free methods".

There follows a description of how the method according to the present invention and the device according to the present invention may be configured by way of example. Basically, the method according to the present invention and the device according to the present invention are trained in an offline phase, that is, before use in a vehicle, which means that the kernel, the class boundaries or the support vectors are established on the basis of training data. That information is then placed in a suitable form in the control unit, that is, is stored in a memory, and then forms the classifier for online operation of the device according to the present invention and the method according to the present invention. If the support vectors and the kernel are placed in the device according to the present invention, the device according to the present invention is able to determine the class boundaries, or directly calculate class membership, online by way of the mentioned equations. It is, of course, also possible to store the class boundaries directly.

Processing of the data basically proceeds as follows: first, recording of the signals of the accident sensor system is performed and feature extraction is carried out. Then, classification using the method according to the present invention takes place and finally activation of the personal protection means takes place.

FIG. 1 explains in a block diagram the device according to the present invention. The device according to the present invention is formed here by way of example as a control unit for activating personal protection means. Control unit SG may in this case be a control unit configured solely for activating personal protection means PS, but alternatively it is possible for it to be a control unit for activating safety means in general and be also capable of intervention in a dynamic handling control system or a braking system. Control unit SG has as its central element a microcontroller μC. That microcontroller μC is an evaluation circuit in accordance with the independent apparatus claim. Alternatively, it is possible for other types of processor or for an ASIC to be used. It may even be possible for a discretely built circuit to be used. Microcontroller μC is connected by a data input/output to a memory S. That memory may be a permanently writable or non-permanently writable memory, as a so-called RAM usually is. Combinations of memories that are also capable of recording data permanently are also possible under the designation S, however. In particular, memories from which, according to the present invention, the class boundary or the kernel and the support vectors may be loaded in order to determine that class boundary. In addition, two interfaces IF1 and IF2 are connected to microcontroller μC, which are formed here as discrete components. That is to say, they are in the form of integrated circuits and convert signals from sensors disposed outside control unit SG into a data format that microcontroller μC is able to process efficiently. There is further connected to microcontroller μC via a data input an acceleration sensor system BS1 which is disposed inside control unit SG. That acceleration sensor system is capable of sensing accelerations at least in the longitudinal direction of the vehicle. Usually, however, it is possible for that acceleration sensor system BS1 to sense also accelerations transversely to or at an oblique angle to the longitudinal direction of the vehicle. An acceleration sensor system in the vertical direction of the vehicle is also possible.

Microcontroller μC has a software interface by which sensor system BS1 is connected to microcontroller μC. Sensor system BS1 may transfer its data to microcontroller μC in analog or digital form. The acceleration sensor system is usually constructed, that is, a micromechanical element provides for sensing of the accelerations. Alternatively, it is possible for further types of sensor, such as a structure-borne noise sensor system or a rotational speed sensor system to be disposed in control unit SG.

Connected to interface IF1 there is a pressure sensor system P and an externally positioned acceleration sensor system BS2. Pressure sensor system P is preferably disposed in the side parts of the vehicle in order to detect a side impact. For this, pressure sensor system P senses an air pressure that is adiabatically compressed in the side part by a side impact. This makes possible very rapid detection of such a side impact. Acceleration sensor system BS2 may be installed in the front of the vehicle in order to detect, for example, collision with a pedestrian or a frontal collision. Acceleration sensor system BS2 is in that instance installed, for example, behind the bumper or on the radiator grille. In addition or instead, it is possible for acceleration sensor system BS2 to be installed in the sides of the vehicle. In that manner, acceleration sensor system BS2 then serves to detect or plausibilize a side impact. Acceleration sensor system BS2 may also be sensitive in various directions in order to be used for plausibilization or detection of specific types of collision.

Data transfer to interface IF1 from pressure sensor system P and from acceleration sensor system BS2 is usually digital. It is possible to use a sensor bus, but in the present case point-to-point connections with Powerline data transfer are provided.

Connected to interface IF2 there is an environment sensor system U which acquires data from the ambient environment of the vehicle. In that operation, other collision objects are recognized, detected and characterized, for example by way of a trajectory or the speed of collision. Radar, ultrasound, infrared, lidar or video sensor systems are possible as the environment sensor system. Other external sensor systems, such as an occupant sensor system, are possible.

Microcontroller μC then activates, as a function of those sensor signals and its activation algorithm, an activation circuit FLIC which serves to activate personal protection means PS. Activation circuit FLIC has end stages which are through-connected when an activation signal comes from microcontroller μC. A logic circuit which compares the signal of microcontroller μC with a signal of a plausibilization device or a parallel evaluation device, which for simplicity is not shown here, may also be present. The personal protection means are, for example, airbags, seat belt tensioners, rollbars, external airbags, a deployable front hood and other personal protection means possible for the protection of occupants or pedestrians. These may be activated pyrotechnically or reversibly, for example by electric motor. For the sake of simplicity, further components that are required for the functioning of control unit SG in general but which do not contribute to an understanding of the present invention have been omitted here.

Microcontroller μC forms from the signals of sensors BS1, P, BS2 and U a feature vector and determines on the basis of, for example, stored linear class boundaries the class to which that feature vector belongs. As indicated above, as an alternative it is possible for the class boundaries to be determined during operation on the basis of support vectors and a kernel. On the basis of the classification, microcontroller μC decides whether an activation signal is generated and what its content is. That activation signal is then transmitted to activation circuit FLIC. Transmission within control unit SG is usually via the so-called SPI bus.

Figure 2:
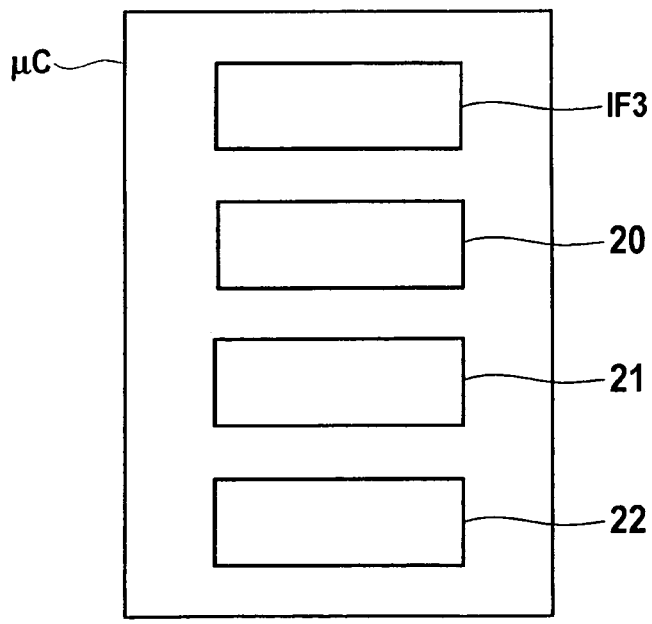
FIG. 2 shows a software structure on the microcontroller.

FIG. 2 explains important software modules used by microcontroller μC. Firstly, the above-mentioned interface IF3 is illustrated, which is used for application of acceleration sensor system BS1. Interface IF3, like hardware interfaces IF1 and IF2, has the function of providing the sensor signals. With software module 20, a feature vector is then formed from the signals of the sensors. That feature vector is classified in the manner according to the present invention by software module 21 and, on the basis of the classification, there is then generated by software module 22, where applicable, an activation signal which indicates which personal protection means are to be activated. Further software modules are possible, but for simplicity have not been illustrated here.

Figure 3:
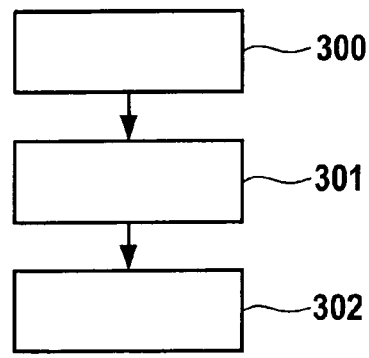
FIG. 3 is a flow chart of the method according to the present invention.

FIG. 3 explains in a flow chart the sequence of the method according to the present invention. In method step 300, a feature vector is formed from the signals of the sensors. That feature vector is classified in method step 301, this being done on the basis of the class boundaries. The latter are either loaded or are determined using the support vectors and the kernel. On the basis of the classification, in method step 302 an activation signal is generated which indicates which personal protection means are to be activated.

Figure 4:
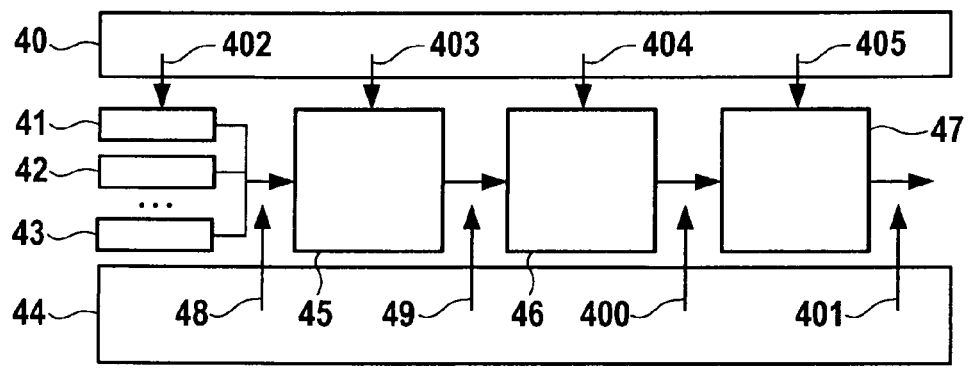
FIG. 4 is a data flow diagram of the method according to the present invention.

FIG. 4 explains in a data flow diagram the function of the device according to the present invention and the sequence of the method according to the present invention executed on the device according to the present invention. The individual processing steps are indicated by block 40. In processing step 402, sensors 41, 42 and 43 generate their signals which are then in the form of measurement data 48. In method step 403, feature extraction from those signals is performed, since the signals involved may be, for example, the signals as such or filtered, integrated, derived, averaged etc., processed signals. In that manner, as indicated by block 44, feature vector 49 is then available. In method step 404, classification by block 46 takes place. That block 46 classifies the feature vector in the manner described above, so that, at the output, class information 400 is available which then enters block 47 which is regarded as processing step 405 and generates activation signal 401.

Figure 5:
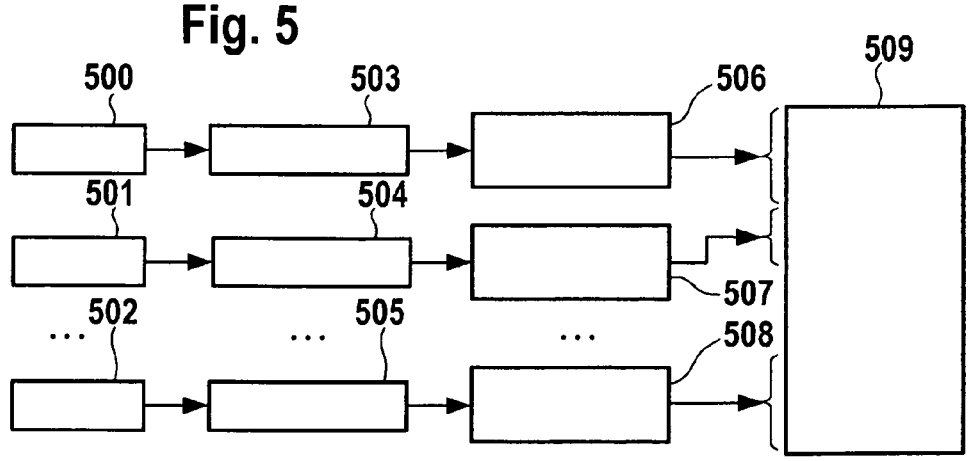
FIG. 5 is a further data flow diagram of the method according to the present invention.

FIG. 5 explains the formation of a feature vector 508. Sensors 500, 501 and 502 are present. Signals thereof are subjected in blocks 503, 504 and 505 to pre-processing, for example filtering or integration or another mathematical operation. In blocks 506, 507 and 508, time block formation and feature extraction then take place. In feature vector 508 then, the features that have been extracted are arranged in a vector, it being possible for there to be a number of vectors per sensor, here, for example, four for sensor 1 and five for sensor N. The number of sensors is not fixed, but there must be at least one sensor. The installation site of the sensors also may be selected from a variety of sites. The method according to the present invention may operate, for example, with centrally installed sensors but may equally operate with peripheral sensors in the side, rear or front of the vehicle. A combination of those installation sites is also possible, as explained above. Suitable sensors are, for example, acceleration sensors, pressure sensors, structure-borne noise sensors, temperature sensors or sensors having other physical measuring principles.

The conversion of the measured individual data in a feature vector preferably takes place in time blocks. It is possible for feature vectors of more than one time block to be calculated. For this, as shown in FIG. 6, the data of individual sensors, which may well have already been subjected to a certain amount of pre-processing, are considered in relation over a specific time, here the block length T, which is designated B1, B2 and B3. As explained above, the feature vector is composed of quantities characterizing the signal within those blocks. This may be, for example, the mean value of the sensor data, the variance or higher moments, the first integral, the second integral, the coefficients of a wavelet decomposition, of a Fourier decomposition, the index values of a code book, if vector quantization is applied to the input data within the block. It is equally possible for the coefficients of a polynomial regression to be determined. The one or more feature quantities selected may be determined in one step at the time of the block end or alternatively may be determined continuously or recursively with the arrival of the data. In the extreme case, it is also possible for the block length T to be adjusted to the scanning time of the sensor, so that each data block contains precisely only one data value which is then converted accordingly into one feature vector. The feature vector may also contain suitably processed data from various sensors having optionally differing sensing principles.

The classification operation has the task, therefore, of dividing the event that has generated the feature vector into certain classes. Such a class division may, for example, be composed of the two classes Fire and NoFire (Example 1). In that case, a binary classifier is involved. Class divisions that characterize the accident event more precisely are also conceivable, however:

Example 2

$C_1$=no triggering event
$C_2$=crash against soft barrier
$C_3$=crash against hard barrier Example 3

$C_1$=no triggering event
$C_2$=symmetrical crash event
$C_3$=left crash
$C_4$=right crash Example 4

$C_1$=crash severity 1
$C_2$=crash severity 2
$C_3$=crash severity 3
$C_4$=crash severity 4
$C_5$=crash severity 5
$C_6$=crash severity 6
$C_7$=crash severity 7

Example 5

$C_1$=crash speed between 0 km/h and 10 km/h
$C_2$=crash speed between 10 km/h and 20 km/h
$C_3$=crash speed between 20 km/h and 30 km/h
$C_4$=crash speed between 30 km/h and 40 km/h
$C_5$=crash speed between 40 km/h and 50 km/h
$C_6$=crash speed between 50 km/h and 60 km/h Using binary classification, such refined classification may be carried out successively, as shown in FIG. 7. In classification plane 70, it is ascertained with classifier 74 whether the crash severity is lower than the value 4. If that is the case, the procedure goes to classifier 75, which ascertains whether the crash severity is <2, and we are then in classifier plane 71. If that is the case, as the classification result the crash severity is ascertained as being 1, as indicated in block 700. If that is not the case, however, a further classifier plane 72 is inserted, with the result that classifier 79 ascertains whether the crash severity is <3. If that is the case, the classification result 701 with crash severity=2 is ascertained, if that is not the case, then the classification result 702 with crash severity=3 is ascertained. If, however, it was ascertained in the classifier plane that the crash severity is not <4, the procedure branches to classifier plane 71 and in so doing to classifier 76. The latter then examines whether the crash severity is <6. If that is the case, the procedure branches to classifier plane 72 and in so doing to classifier 78. The latter examines whether the crash severity is <5. If that is the case, the procedure branches to classification result 73, and in this case to block 703 which ascertains that the crash severity is =4. If it was ascertained by classifier 78 that the crash severity is not <5, the procedure branches to classification result 704 and ascertains that the crash severity is =5. If it was ascertained by classifier 76 in classifier plane 71 that the crash severity is not <6, the procedure branches to classifier 77, and in so doing to classifier plane 72 where it is examined whether the crash severity <7.

If that is the case, classification result 705 that the crash severity is =6 is ascertained. If that is not the case, however, it is then ascertained that classification result 706 is present, namely that the crash severity is =7. Those values are shown as examples here. It is possible for completely different values to be used. As FIG. 7 also shows, it is not necessary for a classifier for each branching point to be present in each classifier plane; it is also possible for the procedure to branch directly to a classification result.

What is claimed is:

1. A method for activating a personal protection device in a vehicle, comprising:
    forming, by a processor of a control unit in the vehicle, a feature vector with at least two features from at least one signal of an accident sensor system;
    comparing, by the processor, the feature vector to each of at least one class boundary;
    assigning, by the processor, the feature vector, in a corresponding dimension, to one of a plurality of classes based on where the feature vector is positioned with respect to the class boundaries as determined in the comparing step; and
    activating the personal protection device as a function of the assigned classification;
    wherein:
        the at least one class boundary is non-linear and determined using at least one training vector and a kernel; and
        the kernel is applied to reduce each at least one class boundary to a corresponding linear class boundary in the feature space.

2. The method as recited in claim 1, wherein the at least one class boundary is obtained from a data memory.

3. The method as recited in claim 1, wherein the classification is carried out in binary form.

4. The method as recited in claim 3, wherein, for the binary classification, at least a first decision tree is used, and wherein a respective binary classification is carried out in each branching point of the decision tree.

5. The method as recited in claim 4, wherein the personal protection device is assigned to the first decision tree.

6. The method as recited in claim 4, wherein a crash severity is assigned to a second decision tree and a crash type is assigned to a third decision tree.

7. The method as recited in claim 1, wherein, for the classification, a regression is used to generate a continuous value.

8. The method as recited in claim 1, wherein the at least two features are obtained from a time block.

9. The method as recited in claim 1, wherein the at least two features are formed from signals of different accident sensors of the accident sensor system.

10. A device for activating a personal protection device in a vehicle, comprising:
    at least one interface configured to provide at least one signal of an accident sensor system;
    a hardware evaluation circuit configured to:
        form a feature vector with at least two features from the at least one signal;
        compare the feature vector to each of at least one class boundary;
        assign the feature vector, in a corresponding dimension, to one of a plurality of classes based on where the feature vector is positioned with respect to the class boundaries as determined in the comparing step; and
        generate an activation signal as a function of the assigned classification; and a hardware activation circuit configured to activate the personal protection device as a function of the activation signal;

wherein:

the at least one class boundary is non-linear and determined using at least one training vector and a kernel; and the kernel is applied to reduce each at least one class boundary to a corresponding linear class boundary in the feature space.

11. A non-volatile hardware computer-readable storage medium storing a computer program having a plurality of codes executable by a computer processor and which, when executed by the computer processor, cause the computer processor to control a method for activating a personal protection device in a vehicle, the method comprising:

forming a feature vector with at least two features from at least one signal of an accident sensor system;

comparing the feature vector to each of at least one class boundary;

assigning the feature vector, in a corresponding dimension, to one of a plurality of classes based on where the feature vector is positioned with respect to the class boundaries as determined in the comparing step; and activating the personal protection device as a function of the assigned classification;

wherein:

the at least one class boundary is non-linear and determined using at least one training vector and a kernel; and the kernel is applied to reduce each at least one class boundary to a corresponding linear class boundary in the feature space.

* * * * *

UNITED STATES PATENT AND TRADEMARK OFFICE
CERTIFICATE OF CORRECTION

PATENT NO. : 8,374,752 B2  Page 1 of 1
APPLICATION NO. : 12/308182
DATED : February 12, 2013
INVENTOR(S) : Breuninger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 994 days.

Signed and Sealed this
First Day of September, 2015

Michelle K. Lee
*Director of the United States Patent and Trademark Office*